United States Patent
Wang et al.

(10) Patent No.: US 8,295,647 B2
(45) Date of Patent: Oct. 23, 2012

(54) COMPRESSIBILITY-AWARE MEDIA RETARGETING WITH STRUCTURE PRESERVING

(75) Inventors: Shu-Fan Wang, Hsing Chu (TW); Shang-Hong Lai, Hsing Chu (TW)

(73) Assignee: National Tsing Hua University, Hsing Chu (TW)

( * ) Notice: Subject to any disclaimer, the term of this patent is extended or adjusted under 35 U.S.C. 154(b) by 458 days.

(21) Appl. No.: 12/659,203

(22) Filed: Mar. 1, 2010

(65) Prior Publication Data
US 2011/0211770 A1    Sep. 1, 2011

(51) Int. Cl.
*G06K 9/32* (2006.01)
(52) U.S. Cl. ........ 382/299; 382/277; 382/300; 382/293; 382/232
(58) Field of Classification Search .............. 382/299, 382/277, 300, 293, 232
See application file for complete search history.

(56) References Cited

PUBLICATIONS

Shai Avidan et al., Seam Carving for Content-Aware Image Resizing.
Michael Rubenstein et al., Improved Seam Carving for Video Retargeting, To appear in the ACM SIGGRAPH conference proceedings, pp. 1-9.
Vidya Setlur et al., Automatic Image Retargeting.
Chenjun Tao et al., Active Window Oriented Dynamic Video Retargeting, Department of Computer Science and Engineering, CUHK, Hong Kong.
Lior Wolf et al., Non-homogeneous Content-driven Video-retargeting, The School of Computer Science, Tel-Aviv University, 2007.
Yu-Shuen Wang et al., Optimized Scale-and-Stretch for Image Resizing.
Shu-Fan Wang et al., Fast Structure-Preserving Image Retargeting, Department of Computer Science, National Tsing Hua University, HsinChu, Taiwan.
Laurent Itti et al., A Model of Saliency-Based Visual Attention for Rapid Scene Analysis, IEEE Transactions on Pattern Analysis and Machine Intelligence, Nov. 1998, pp. 1254-1259, vol. 20, No. 11.
Joost van de Weijer et al., Robust Photometric Invariant Features from the Color Tensor, IEEE Transactions on Image Processing, Jan. 2006, pp. 118-127, vol. 15, No. 1.
C. C. Paige et al., Solution of Sparse Indefinite Systems of Linear Equations, Siam J. Numer. Anal., Sep. 1975, pp. 617-629, vol. 12, No. 4.

*Primary Examiner* — Chan S Park
*Assistant Examiner* — Mark Roz
(74) *Attorney, Agent, or Firm* — Bacon & Thomas, PLLC (57) ABSTRACT

The present invention provides a method for retargeting an image, comprising determining a total block structure energy of an input image content. A compressibility rate of the input image content is determined based on the total block structure energy. An optimal scaling factor of the input image content is obtained. The input image content is warped by using a new coordinate matrices and uniformly scaling the input image content to a target image resolution.

8 Claims, 6 Drawing Sheets

COMPRESSIBILITY-AWARE MEDIA RETARGETING WITH STRUCTURE PRESERVING

BACKGROUND

References

[1] S. Avidan and A. Shamir, "Seam carving for content-aware image resizing," ACM Transactions on Graphics (SIGGRAPH), vol. 26, no. 3, 2007.
[2] M. Rubinstein, A. Shamir, and S. Avidan, "Improved seam carving for video retargeting," ACM Transactions on Graphics (SIGGRAPH), pp. 1-9, 2008.
[3] V. Setlur, S. Takagi, R. Raskar, M. Gleicher, and B. Gooch, "Automatic image retargeting," ACM SIGGRAPH Sketches, vol. 154, p. 4, 2004.
[4] C. Tao, J. Jia, and H. Sun, "Active window oriented dynamic video retargeting," Workshop on Dynamical Vision ICCV, 2007.
[5] L. Wolf, M. Guttmann, and D. Cohen-Or, "Non-homogeneous content-driven video-retargeting," International Conference on Computer Vision, pp. 1-6, 2007.
[6] Y.-S. Wang, C.-L. Tai, O. Sorkine, and T.-Y. Lee, "Optimized scale-and-stretch for image resizing," ACM Transactions on Graphics (SIGGRAPH Asia), pp. 1-8, 2008.
[7] S.-F. Wang and S.-H. Lai, "Fast structure-preserving image retargeting," Proceedings of the 2009 IEEE International Conference on Acoustics, Speech and Signal Processing, pp. 1049-1052, 2009.
[8] L. Itti, C. Koch, and E. Niebur, "A model of saliency-based visual attention for rapid scene analysis," IEEE Trans. Pattern Anal. Mach. Intell., 1998.
[9] J. V. D. Weijer, T. Gevers, and A. W. M. Smeulders, "Robust photometric invariant features from the color tensor," IEEE Trans. Image Processing, vol. 15, p. 2006, 2004.
[10] C. C. Paige and M. A. Saunders, "Solution of sparse indefinite systems of linear equations," SIAM J. Numer. Anal., vol. 12, pp. 617-629, 1975.

FIELD OF THE INVENTION

The present invention relates to an image processing method for retargeting image/video data, and more particularly to a method of compressibility-aware media retargeting with structure preserving.

DESCRIPTION OF THE PRIOR ART

Image resizing is a standard tool in many image processing applications. It works by uniformly resizing the image to a target size. Recently, there is a growing interest in image retargeting that seeks to change the size of the image while maintaining the important features intact, where these features can be either detected top-down or bottom-up. Top down methods use tools such as face detectors to detect important regions in the image, whereas bottom up methods rely on visual saliency methods to construct a visual saliency map of the image. Once the saliency map is constructed, cropping can be used to display the most important region of the image.

In recent years, content-aware image/video retargeting becomes more and more important due to the increasing demand for displaying image on a variety of display devices of different resolutions or aspect ratios. A number of algorithms have been proposed to adapt image or video content to various display settings. The existing methods largely fall into three categories: One applies the cropping or carving strategies to remove less important regions (refer to the reference [1], [2]), the second segments the image into foreground and background layers and scales each layer independently (refer to the reference [3], [4]), and the third approach is based on adaptively warping the image based on the local image saliency (refer to the reference [5], [6]).

For the cropping based methods using some algorithms, they applied cropping to remove less important regions from the images which may discard a large amount of information and sometimes fail if the important features are located at distant parts in the image/video. To deal with this problem caused by cropping, Avidan and Shamir (refer to the reference [1]) proposed an interesting idea of incrementally removing or inserting regions, called seam carving. However, simply extending seam carving to video retargeting will create jittery artifacts. Therefore, they improved the seam carving algorithm to find minimal-cost seams by computing the forward energy to reduce the effect of artifacts (refer to the reference [2]). Seam carving is an effective technique for image/video retargeting, although in some cases it can not avoid the problem of producing artifacts or distorting content structures.

Without cropping or carving the image content, image segmentation can provide an alternative way to separate the image regions of different importance. Recently, Wolf et al. (the reference [5]) presented a warping based method that automatically detects the important regions by combining a saliency measure, face detector and motion estimation for video retargeting. They formulated the grid mapping of image resizing as solving a large and sparse linear system. Based on the similar idea, Wang et al. (the reference [6]) presented a method which allows important regions to scale uniformly and homogeneous regions to be distorted. This method gives more freedom to utilize homogeneous image regions. From the results in the reference [5], [6], they are limited to well preserve the global shapes of prominent objects well in the retargeted image/video. Different approaches may be suitable to retarget images with different content. On the other hand, we may need to combine several approaches to retarget an image properly.

In human visual system (HVS), human eyes are very sensitive to certain object shapes, like circles or straight lines. Based on the image saliency measure, most of the previous works constrain the retargeting process in a bottom-up strategy to preserve the structure continuity, which may not well preserve the global image structure. For instance, in the seam carving approach (refer to the reference [1], [2]), they remove/insert an eight-connected seam to resize the images. Most of the prior arts resize the images according to the estimated energy, and also minimize the distortion of neighboring pixels (refer to the reference [1], [2], [5] or quads [6]). Based on these bottom-up schemes, the distortion will accumulate to generate undesirable image structure distortion or noticeable artifacts. In the warping-based methods, most distortions are caused by non-uniform warping on vulnerable objects. Furthermore, based on the fundamental idea of the retargeting algorithm by Wolf et al. (the reference [5]), the formulation for the image retargeting problem is cast as solving a constrained linear system. While most previous works focused on spatial domain image/video retargeting. Some other works applied the video retargeting along the time domain, and the trimming of less important frames leads to shortening the image sequences. More recently, some researchers treat the retargeting problem as a jigsaw puzzle, i.e. reassemble the patches or pixels. These methods can also be used to edit images via some human interaction. In the previous methods, each method has the common problem in most of the previous work, i.e. structure distortion.

In view of the aforementioned drawbacks, the present invention provides an improved method for media retargeting to overcome the above-mentioned issues in most of the previous work.

SUMMARY OF THE INVENTION

To overcome the prior art drawbacks, the present invention provides a techniques of top-down block structure energy estimation and media compressibility estimation to reach the purpose for image content structure preserving.

Another objective of the present invention is to provide a method for the preservation of global image structure.

In contrast to the previous works, the object structure may be protected and minimize the distortion with a global approach and balance of content-awareness and media compressibility.

Yet another objective of the present invention is to provide a method of compressibility-aware media retargeting with structure preserving to reach the purpose of better image content and object structure preservation without over compressing or stretching.

To obtain the purpose of above-mentioned, the present invention provides a method for retargeting an image, comprising: determining a total block structure energy of an input image content by a CPU or a processing unit; determining a compressibility rate of the input image content based on the total block structure energy by the CPU or the processing unit; determining an optimal scaling factor of the input image content by the CPU or the processing unit; and warping the input image content by using a new coordinate matrices and uniformly scaling the input image content by the CPU or the processing unit to output a target image resolution.

The method for retargeting an image further comprises a step of solving the least-squares solution of a sparse linear system by the CPU or the processing unit before warping the input image content.

Another aspect of the present invention is a method for retargeting a video, comprising: determining a total block structure energy and a compressibility rate of an input video content of each frame by a CPU or a processing unit; determining an optimal scaling factor of the input video content by the CPU or the processing unit; and warping the input video content by using a new coordinate matrices and uniformly scaling the input video content by the CPU or the processing unit to a target video resolution.

Furthermore, the method further comprises a step of solving the least-squares solution of a sparse linear system with additional constraints and smoothing the optimal scaling factors before warping the input video content.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited expect as specified in the accompanying claims.

To overcome the prior art drawbacks, the present invention provides an adaptive image resizing algorithm that well preserves prominent structure in the image. Instead of minimizing the distortion of neighboring pixels or grids, the present invention defines a block structure energy that uniformly distributes the energy of local structure over the pixels inside the bounding box of the detected structure segment. Based on this energy, the proposed algorithm enforces the deformation of each block area to be as uniform as possible. According to the image content, the present invention further proposes to estimate the compressibility rate in each direction. The compressibility rate and the total entropy help to determine the optimal scaling factors which are used to resize the image to the optimal resolution with the same aspect ratio of the target image size. Experimental comparisons with previous image retargeting methods showed superior structure preservation in the image resizing results by using the proposed algorithm.

The present invention proposes to preserve the image structure with a top-down strategy by using a block saliency map which is adaptive to the sizes of the structured objects. The compressibility rate for each image from its image gradient magnitude and orientation distribution is evaluated. The retargeting process is optimized based on the compressibility assessment in both x and y directions. The resized image frames therefore meet the fundamental requirements: retaining salient content and preserving global structure. In the present invention, the different strategies are utilized to adaptively resize images such that the salient image content and structures are well preserved.

In the image/video retargeting, it may fit the content into different types of display devices, and the aspect ratio could be changed while the important part of the content should be retained as best as possible. In the previous research of the present inventors, it focused on the preservation of line structure in an image (refer to the reference 7), but it is not sufficient for different kinds of object structures. In the present invention, the image resizing will be dealt with from a new perspective, i.e. retargeting the image aspect ratio. Without considering the actual target size, the optimal width and height will be firstly determined to best fit the original image to the target aspect ratio and then uniformly scale it to the target image size. The proposed algorithm can be summarized as shown in FIG. 1.

Figure 1:
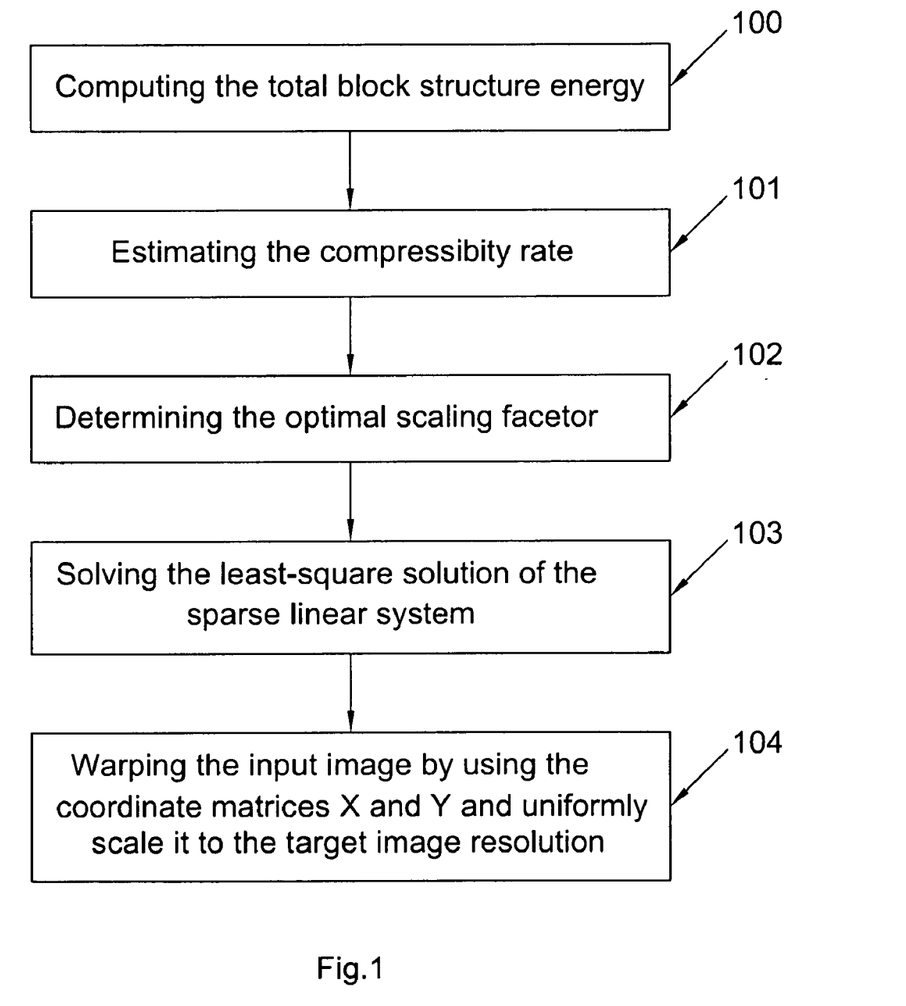
FIG. 1 is the process flow of an image retargeting according to the present invention.
Figure 2:
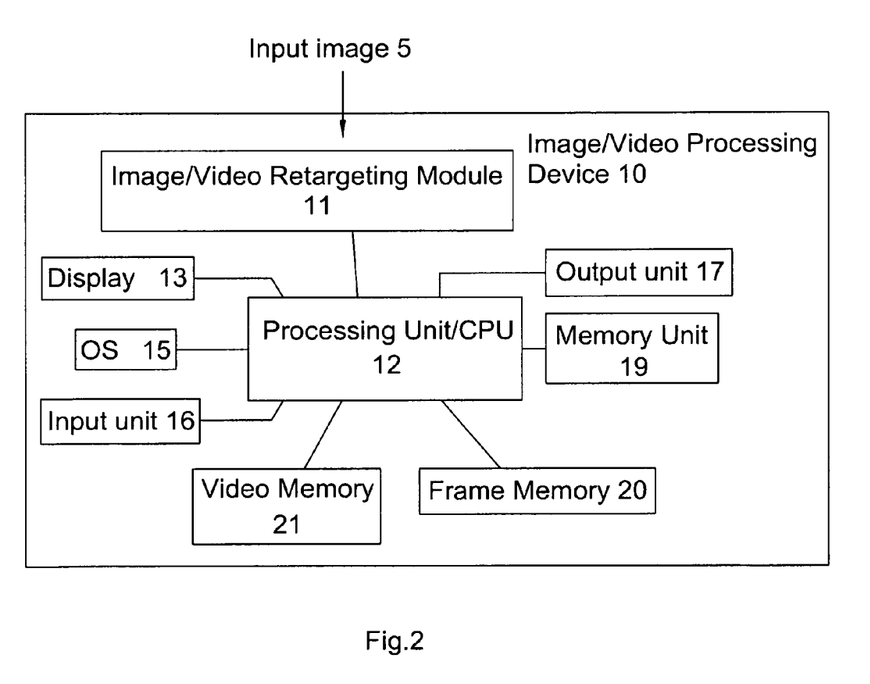
FIG. 2 shows a block diagram of an image/video processing device.

Please refer to FIG. 1, it shows the process flow of an image retargeting according to the present invention. The image retargeting may be implemented in an image/video processing device or a display device 10 shown in FIG. 2. FIG. 2 shows a block diagram of the image/video processing device 10 which may comprise a image/video retargeting module 11, a CPU or a processing unit 12, a display 13, a OS 15, an input unit 16, an output unit 17, a memory unit 19, a frame memory 20 and a video memory 21, etc. The diagram is used for illustrating and not used for limiting the scope of the present invention. The different types of the image/video processing device or display devices are, for example digital TVs, computers, notebook, cellular phones, iPhone, iPod, eBook, digital photo frame, etc. The input image 5 is inputted into the image/video retargeting module 11 serving as an image processing unit to perform pre-processing of the input image signal outputted from a display device. Due to the image/video retargeting module is not the main feature of the present invention, and therefore the detailed description is omitted. The memory unit 19 includes a ROM program memory, a RAM memory and a nonvolatile FLASH memory. The frame memory 20 stores a frame image after processing by the image/video retargeting module. The video memory 21 stores a video image after processing by the image/video retargeting module. The input unit 16 is used for reading data and programs from an external device, and the output unit 17 is used for outputting data from the processing unit 12.

In the first step 100, it performs to determine/compute the total block structure energy of the content structure in an input image by a CPU (central processing unit) or a processing unit, for example the processing unit 12 of the FIG. 2. The input image 5 may be processed by the image processing unit (image/video retargeting module 11), and then computing the total block structure energy of the image content structure by the CPU or processing unit. Several possible image importance may be addressed by block structure energy. In one embodiment, based on a warping based approach, a block structure energy may be introduced for structure preservation. To estimate the significance of an image, the present invention utilizes the intensity gradient, block structure energy and content saliency (map) to reach the purpose of the image retargeting, and protect the object structure and minimize the distortion with a global approach. In other words, the present invention proposes a global approach for each structure piece; namely, top-down method, without adapting connected pixels (Seam Carving), neighboring pixels (Wolf et al. 2007) or neighboring grids (Wang et al. 2008) which method's distortion is accumulated in local smoothness. The global approach enforces the bounding boxes scaling uniformly, and then the content structures are safe in the boxes. The relative importance can be determined by the proposed block structure energy.

In order to extract the contours in colorful images, the color tensor proposed in the reference [9] may apply to detect the salient edges. The extracted contour may connect to other object contours and spread over the whole image. Therefore, the extracted edges into several pieces may be decomposed by simply cutting at the corners which may detected by the Harris corner detector. It is noted that structure segments consisting of not enough pixels are treated as noises and then removed.

The present invention provides a more simple and effective way to protect the extracted structure pieces; namely, the block structure energy. The basic idea of structure preserving is that all pixels inside the block structure energy should be stretched or compressed as uniformly as possible. In order to maintain the prominent structures, each structure piece should be considered as a single unit and protected. Take a straight line for example, the pixels on the line segment should have the same slope after retargeting. Therefore, all pixels lie on the line are constrained to have the same slope. There are many prominent structure pieces of various shapes to be protected after retargeting. Please refer to FIG. 2, the extracted (content) structure pieces 200 includes the straight line and curve and enforcing the deformation to be uniform in each direction. In FIG. 2, the block structure energy form a jelly-like space and protect the structure pieces from severe distortion. For example, the extracted structure pieces 200 may be compressed along x-direction, y-direction and (x and y)-direction to become as the structure pieces 201, 202 and 203, respectively. It can be noticed that the straight line of the structure pieces 201, 202 and 203 is still straight and the curve of the structure pieces 201, 202 and 203 also bend gracefully without producing artifacts.

Next, the flexibility of each structure piece separately for x and y directional retargeting may be defined. Let Bi denotes the set of pixels in the bounding blocks that bounds and protects structure i. For x-directional retargeting, the block structure energy values of all pixels in block Bi are the same and can be defined as:

$$E_i^x(p_j) = \begin{cases} \frac{1}{|e_i|} \sum_{k \in e_i} |G_x(p_k)| & \text{if } p_j \in B_i \\ 0 & \text{if } p_j \notin B_i \end{cases} \quad (1)$$

where the $e_i$ denotes the set of indices of the edge pixels for structure i and $G_x = \partial I/\partial x$ denotes the x partially differential of an input image; namely, the intensity gradient. It is noted that a pixel Pj might be covered by more than one block, and therefore the combined total energy along x direction may be defined as:

$$E_{all}^x(p_j) = \max\{|G_x(p_j)|, E_{sal}(p_j), \max_i \{E_i^x(p_j)\}\} \quad (2)$$

where $E_{sal}$ denotes the saliency map which may be proposed by Itti et al. (the reference [8]). It is noted that $|G_x|$, $E_{sal}$ and $E_i^x$ are normalized and range between 0 and 1. The total block structure energy along y direction can also be defined in a similar way:

$$E_{all}^y(p_j) = \max\{|G_y(p_j)|, E_{sal}(p_j), \max_i \{E_i^y(p_j)\}\} \quad (3)$$

According to the equations 2 and 3, it can estimate the significance of the input image by the intensity gradient, block structure energy and saliency map. The total block structure energy may be selected or determined by the intensity gradient, block structure energy and saliency map, for example the maximum value of thereof. The combined energy maps in different axes (for example, energy maps for resizing horizontally or vertically) are defined separately to provide more flexibility for retargeting (x and y directional resizing). It is noticed that the block structure energy for different directions is different according to the orientation of each structure. In other words, if some structure is vulnerable in one direction, the structure of such block will be strengthened in this direction.

Figure 4:
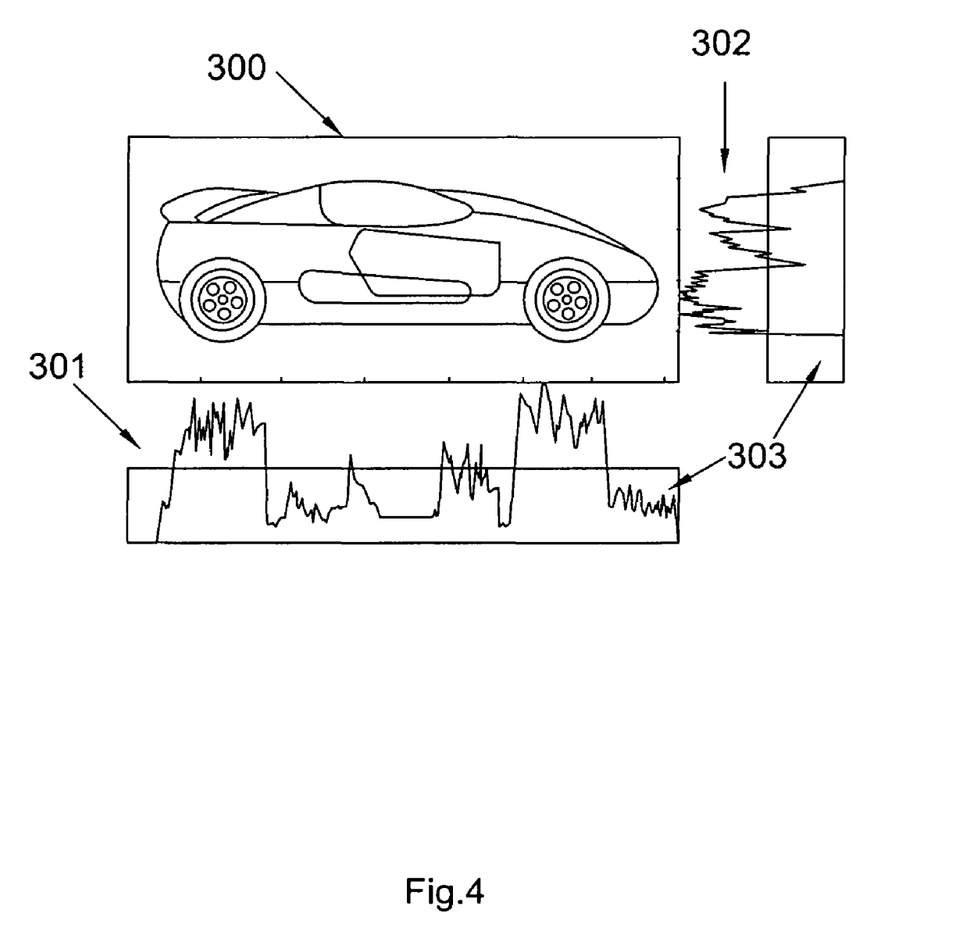
FIG. 4 is an example of the compressibility rate.

Next, referring to FIG. 1, in the second step 101, it performs to determine/estimate the compressibility rate of the input image content structure in each direction by the CPU (central processing unit) or the processing unit. Over compression/stretch may distort the content structure, and thus distributing the compression/stretching along x and y direction is essential to minimize the distortions. From above description, the significance of the input image may be estimated by the intensity gradient, block structure energy and saliency map. In other words, the optimal compressibility rate may be estimated according to the energy maps of the image content. In the embodiment, the present invention utilizes the resizing in both directions, for example utilizing homogeneous image regions for shrinking and stretching along x and y directions which may be proposed by [6]. Since such method is addressed as changing the width and height to fit the target aspect ratio. Images with different content may have different flexibility for retargeting, and the compressibility rate in each direction may be evaluated and its definition is given as follows:

$$r_x = \frac{1}{W} \sum_x \max\left\{\left(\overline{G_{max_y\{G\}}} - \max_y\{G(x, y)\}\right), 0\right\} \quad (4)$$

$$r_y = \frac{1}{H} \sum_y \max\left\{\left(\overline{G_{max_x\{G\}}} - \max_x\{G(x, y)\}\right), 0\right\}$$

where $G(x, y) = \sqrt{G_x(x,y)^2 + G_y(x,y)^2}$ denotes the intensity gradient magnitude at pixel $(x, y)$. $\overline{G_{max_x\{G\}}}$ and $\overline{G_{max_y\{G\}}}$ are the averages of maximal intensity gradient values along x and y directions. The two values, $\overline{G_{max_x\{G\}}}$ and $\overline{G_{max_y\{G\}}}$, are thresholds for the important intensity gradient magnitudes which also provide bottom lines of the compressibility rates $r_x$ and $r_y$. The compressibility rates $r_x$ and $r_y$ are estimated by using the equation 5. Please refer to FIG. 4, it shows an example of the compressibility rate. In FIG. 4, the intensity gradient magnitudes distribution 301 and 302 of an input image 300, for example an automobile, along x and y directions respectively, is shown, and the compressible area 303 may be selected or determined. The compressible area 303 may be relatively unimportant area. Since this embodiment use max operator, this measure is a fundamental safe line.

Subsequently, referring to FIG. 1, in the third step 102, it performs to determine the optimal scaling factor of the input image content structure in each direction by the CPU or the processing unit. In the present invention, the aspect ratio of source image and target image may be only considered. The image retargeting is defined as retargeting a source (input) image with size $W_o \times H_o$ to a target (retargeted) image with size $W_r \times H_r$. $W_o$ indicates the width of the source image and $H_o$ indicates the height of the source image. $W_r$ indicates the width of the retargeted image and $H_r$ indicates the height of the retargeted image. In one embodiment, the optimal scaling factor between the source image and the target image may only consider the aspect ratio thereof. Let $S_x$ and $S_y$ denote the resizing factors in x and y directions, respectively, and thus the linear relation of image resolutions between the input and the retargeted images can be written as:

$$\frac{S_x \cdot W_o}{S_y \cdot H_o} = \frac{W_r}{H_r} \quad (5)$$

According to different image content, the best $S_x$ and $S_y$ might be different even though the target aspect ratio $(W_r/H_r)$ keeps unchanged.

Figure 5:
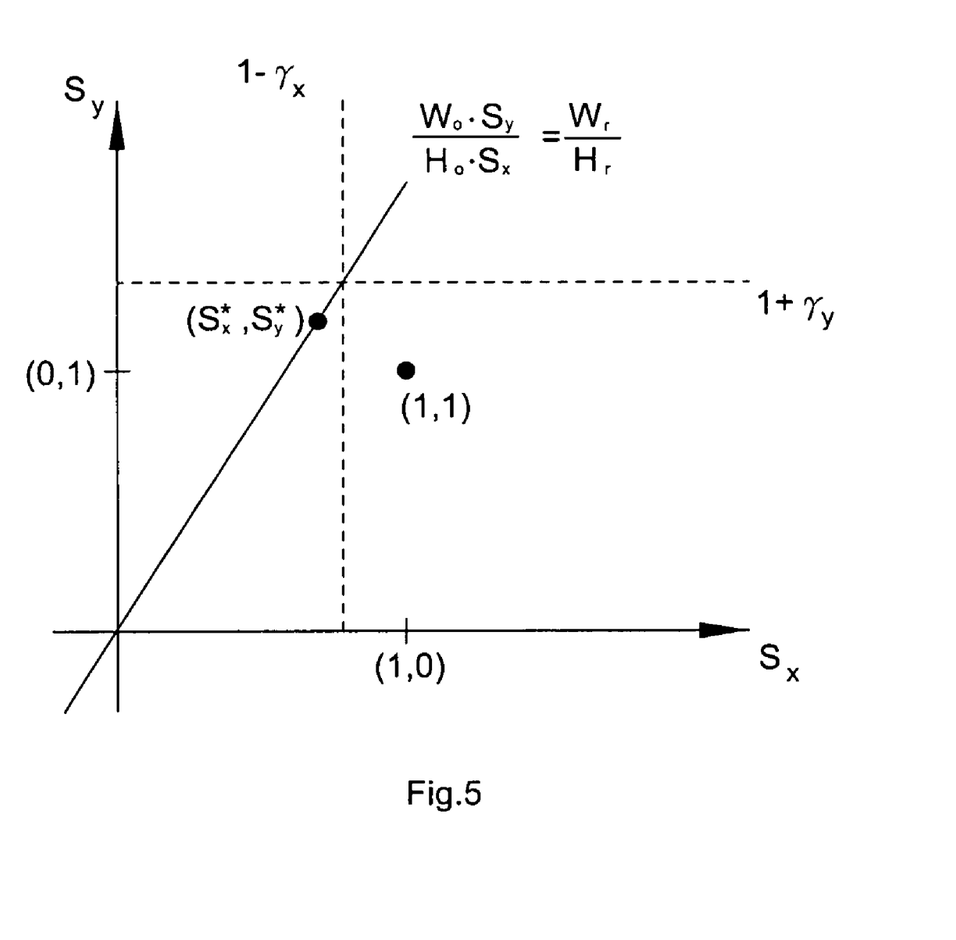
FIG. 5 shows an aspect ratio constraint of the optimal scaling factor according to the present invention.

Please refer to FIG. 5, it shows the resizing factor $(S_x, S_y)$ coordinate system, wherein the x-direction resizing factor $S_x$ denotes x axis coordinate and y-direction resizing factor $S_y$ denotes y axis coordinate. The resizing factor location $(S_x, 0)$, along x direction, located at right side and left side of the point $(1, 0)$ means stretching and compressing, respectively. Similarly, the resizing factor $(0, S_y)$, along y direction located up side and down side of the point $(0, 1)$ means stretching and compressing, respectively. In FIG. 5, it indicates that the optimal scaling factor solution $(S_x^*, S_y^*)$ needs to meet the requirements of the aspect ratio constraint (i.e. the equation 5), compressibility rates and close to original size, i.e. the point $(1, 1)$. That is, to minimize the retargeted distortion, the first consideration is to make the resizing factor $(S_x, S_y)$ close to original size $(1, 1)$. The second consideration is to make the resizing factor $(S_x, S_y)$ close to the safe line defined by the estimated compressibility rate (or stretch rate), for example $(1-r_x, 1+r_y)$.

As shown in FIG. 5, we combine the above two considerations with the aspect ratio constraint and the problem can be formulated as:

minimize $(S_x-1)^2 + (S_y-1)^2 + \omega((1-r_x-S_x)^2 + (1+r_y-S_y)^2)$ subject to $S_x = \beta \cdot S_y$ \quad (6)

where $\beta = W_r \cdot H_o / W_o \cdot H_r$ is a constant. Thus, the closed-form solution of the formulation, i.e. the scaling factor optimization $(S_x^*, S_y^*)$, can be easily determined and is given by:

$$S_x^* = \beta \cdot S_y$$

$$S_y^* = \beta + 1 - \omega \cdot (r_x \cdot \beta - \beta - 1 - r_y)/(1+\omega)(\beta^2+1) \quad (7)$$

It is note that $\omega$ can be defined or just a constant. Since it may depend on image content, $\omega$ may be automatically determined by structure complexity estimation. If the content structure is clear, it weights heavier on the compressibility rate and vice versa. The structure complexity may be defined as the function (combination) of the image gradient magnitude and orientation:

$$\omega = c \cdot \exp(-H_{all})$$

where $H_{all} = (H_{\|g\|} + H_g)$ \quad (8)

where $H_{\|g\|}$ is the entropy of image gradient magnitudes and it stands for the complexity of gradient variations. $H_g$ denotes the entropy of gradient orientations, which is related to the consistence of content structure, and c is a constant used to rescale $\omega$ to the range between 0 and c. It is noted that $H_{all}$ is positive related to the complexity of the image gradient magnitudes and orientations. Therefore, the higher $H_{all}$ is, the smaller weight $\omega$ is. The structure complexity $\omega$ may be used as the freedom for image resizing.

Referring to FIG. 1, in the step 103, it performs to solve the least-squares solution of the sparse linear system by the CPU or the processing unit. Recall that the relation of stretching/shrinking in x and y directions is defined by the resolution of source and target image: $S_x = \beta \cdot S_y$. The optimal resizing factor $S_x^*$ and $S_y^*$ corresponding to different image content can be determined by the Equation 7. If $\beta < 1$, the image should be compressed along x-direction and stretch along y-direction. If $\beta > 1$, it just have to transpose the image and do the same thing. In the present invention, for example, retargeting a given image of size $(W_o \times H_o)$ to size $(S_x W_o \times S_y H_o)$ is requested, it needs to recover the new coordinate $(Xp, Yp)$ of pixels $p = (x, y)$ under three types of constraints. For example, the constraints may be geometric constraints. It takes the calculation of Xp, for instance. In the first constraint, each pixel is supposed to be at a fixed distance from its left and right neighbors: $X_{x,y} - X_{x-1,y} = 1$ and $X_{x+1,y} - X_{x,y} = 1$. The second constraint is to map each pixel to a location similar to the one of its upper and lower neighbors: $X_{x,y} - X_{x,y+1} = 0$. The third constraint is to fit the warped image to the dimensions of the resized image size $X_{1,y} = 1$ and $X_{W_o,y} = S_x W_o$. In one embodiment, for content-aware image retargeting, an important pixel should be warped to a distance approximately one pixel from its neighbors while less important ones can be blended with their neighbors or be carved off. Therefore, the first constraint mentioned above should be weighted by the corresponding structure energy value $E_{all}^x$ (i.e., the equation 2). Since the shrinking and stretching of pixels inside each block structure energy should be as uniform as possible, the maximum importance value 1 may assign to the second constraint (smoothness term) if $(x, y) \in B$, where $B = U_{\forall i} B_i$ is the set of all pixels covered by the structure blocks. The equations in the constrained linear system are written as:

$$E_{all}^x(x, y)(X_{x,y} - X_{x-1,y}) = E_{all}^x(x, y) \quad (9)$$
$$E_{all}^x(x, y)(X_{x+1,y} - X_{x,y}) = E_{all}^x(x, y)$$
$$E_{ud}^x(x, y)(X_{x,y} - X_{x,y+1}) = 0$$
$$X_{1,y} = 0, \; X_{W_0, y} = S_x \cdot W_o$$

Where $$E_{ud}^x(x, y) = \begin{cases} 1 & \text{if } (x, y) \in B \\ E_{all}^x(x, y) & \text{if } (x, y) \notin B \end{cases}$$

The weight $E_{ud}^x$ denotes the importance between up-and-down pixels which controls the smoothness over pixels $X_{x,y}$. All the equations in the Equation 9 form an over-determined constrained sparse linear system, wherein the first three equations denote neighboring constraints and the fourth equations denotes boundary constraints. The optimized new coordinates of the pixels can be obtained by minimizing the sum of squared errors of the above equations, which is equivalent to find the least-squares solution (x) of the sparse linear system ($A_x \approx b$). Similarly, the coordinate variables $Y_{x,y}$ of the pixels (x, y) can also be obtained from the least-squares solution of the corresponding sparse linear system given by:

$$E_{all}^y(x, y)(Y_{x,y} - Y_{x,y-1}) = E_{all}^y(x, y) \quad (10)$$
$$E_{all}^y(x, y)(Y_{x,y+1} - Y_{x,y}) = E_{all}^y(x, y)$$
$$E_{ud}^y(x, y)(Y_{x,y} - Y_{x+1,y}) = 0$$
$$Y_{x,1} = 0, \; Y_{x,H_0} = S_y \cdot H_o$$

Where $$E_{lr}^y(x, y) = \begin{cases} 1 & \text{if } (x, y) \in B \\ E_{all}^y(x, y) & \text{if } (x, y) \notin B \end{cases}$$

The weight $E_{lr}^y$ denotes the importance between left-and-right pixels which controls the smoothness over pixels $Y_{x,y}$. Similarly, all the equations in the Equation 10 form an over-determined constrained sparse linear system, wherein the first three equations denote neighboring constraints and the fourth equations denotes boundary constraints. In other words, according to the equations 9 and 10, the least-squares solution of the sparse linear system can be easily determined. Based on the solution of the sparse linear system, the image warping can be obtained.

Figure 3:
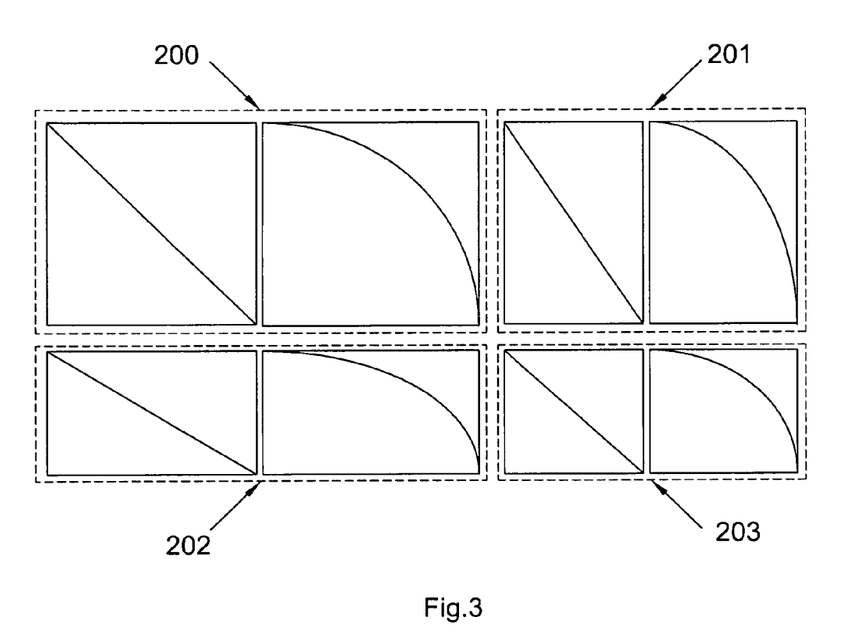
FIG. 3 is a compression of a content structure along x and y directions.

Referring to FIG. 1, in the step 104, it performs to warp the input image by using a new coordinate matrices (X and Y) and uniformly scale it to the target image resolution by the CPU or the processing unit. The resized image can be produced by warping the original image according to the new coordinates of all pixels, X and Y, based on the equations 9 and 10. It is noted that the target size ($S_x W_O \times S_y H_O$) may not equal to the exact target image resolution ($W_r \times H_r$). Although the resized image resolution after the above warping process is ($S_x W_O \times S_y H_O$) but not ($W_r \times H_r$), we can scale it uniformly to ($W_r \times H_r$) because the aspect ratios are the same. Examples of the compressibility rate and resizing factor estimations are shown in FIG. 3, FIG. 4 and FIG. 5. With separate energy maps in x and y directions, it may be known if such estimations result suits to resize along specific direction.

For example, $S_x = 0.62$ and $S_y = 1.24$, the compressibility rates on both directions are high, and therefore the compression along x direction may be more and the stretching along y direction may be a little. In order to visualize the final operations on the whole image, we measure the distance between neighboring pixels along x and y direction on X and Y matrix respectively. The corresponding compression/stretching distribution $O^x = \partial X / \partial x$ and $O^y = \partial Y / \partial y$ are colorized by using a jet color bar. It may be observed that the structures are well preserved by the block structure energy.

Another topic of the present invention relates to a video retargeting. The summarized algorithm for the video retargeting is shown in FIG. 5. Video retargeting is the process of transforming an existing video to fit the dimensions of an arbitrary display. Please refer to FIG. 5, it shows the process flow of the video retargeting according to the present invention. Similarly, the video retargeting may be implemented in an image/video processing device or a display device, for example the device of the FIG. 2. In the first step 500, it performs to determine/compute the total block structure energy and compressibility rate for each frame by a CPU or a processing unit. As moderate video camcorder becomes more and more affordable, users can easily create their own media content. To fit it into different types of the image/video processing device or display devices, for example digital TVs, computers, notebook, cellular phones, iPhone, iPod, eBook, digital photo frame, etc., the video frames should be resized adaptively based on their content. However, resizing each frame individually may lead to flickering artifacts. In order to meet the requirement of the video retargeting, some modifications may be made and extending the image retargeting technique presented above. First of all, the most salient area that draws a viewer's attention in a video clip is the moving objects. With this consideration, the saliency measurement in the Equation 2 and the Equation 3 by the normalized motion energy $E_m$ may be replaced as:

$$E_{all}^x(p_j) = \max\left\{|G_x(p_j)|, E_m(p_j), \max_i\{E_i^x(p_j)\}\right\} \quad (11)$$
$$E_{all}^y(p_j) = \max\left\{|G_y(p_j)|, E_m(p_j), \max_i\{E_i^y(p_j)\}\right\}$$

Where $E_m$ denotes the magnitude of motion field computed from the neighboring image frame. For efficiency consideration, the motion vectors may only be estimated on the detected corners. It approximately takes the average of the motion vectors as the camera motion and the actual object motion can be estimated by eliminating the camera motion. It is noted that the $E_m$ is also normalized to range between 0 and 1.

Subsequently, referring to FIG. 6, in the second step 501, it performs to determine the optimal scaling factor of each frame by the CPU or the processing unit. With the estimated total energy, the optimal resizing factor ($S_x^*$, $S_y^*$) of each frame in the video may be estimated. According to abovementioned, the scaling factor optimization ($S_x^*$, $S_y^*$) can be easily determined by the equation 7.

Next, in the third step 502, it performs to solve the sparse linear system with additional constraints and smooth the scaling factors $S_x^*$ and $S_y^*$ by the CPU or the processing unit. To keep the temporal coherence, the optimal resizing factor $S_y^*$ may smooth over time by using the moving average method.

The corresponding $S_x^*$ can be determined by using the smoothed $S_y^*$ through the aspect ratio constraint ($S_x^* = \beta \cdot S_y^*$). Similar to the temporal smoothness used in the reference [5], the smoothness of the mapping between adjacent frames may be enforced by including the following constraints (i.e. the equation 12) to the linear system formed by the Equation 9 and the Equation 10. The constraint equations are as follow:

$$X_{x,y}^t - X_{x,y}^{t+1} = 0$$

$$Y_{x,y}^t - Y_{x,y}^{t+1} = 0 \quad (12)$$

Similarly, according to the equations 9 and 10 with additional constraints (i.e. the equation 12), the least-squares solution of the sparse linear system can be also easily determined.

Figure 6:
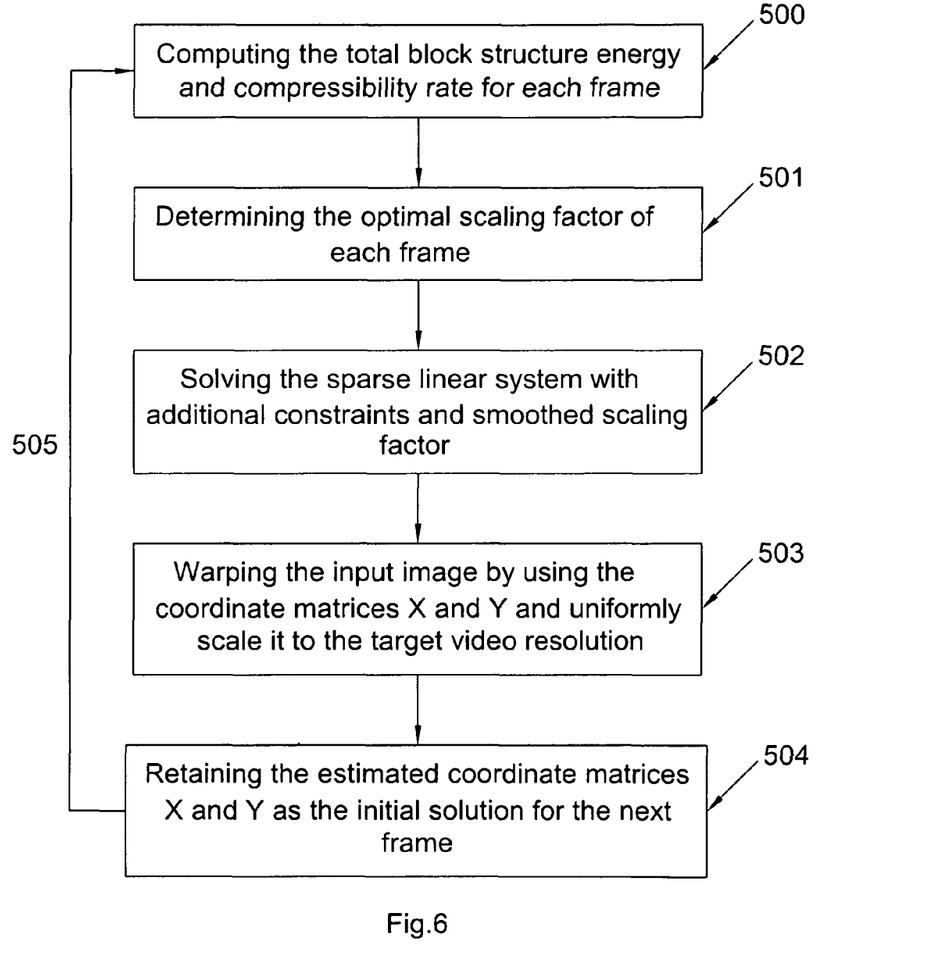
FIG. 6 is the process flow of a video retargeting according to the present invention.

Referring to FIG. 6, in the step 503, it performs to warp the input image by using the coordinate matrices X and Y and uniformly scale the input image by the CPU or the processing unit to output the target video resolution. The resized image can be produced by warping the original image according to the new coordinates of all pixels, X and Y, based on the equations 9 and 10 with additional constraints. Since the warping matrices X and Y are smooth and similar between adjacent frames, the warping matrices may be estimated with the initial guess obtained from the previous frame and the corresponding linear system can be solved efficiently by using symmetric LQ method (refer to the reference [10]). For more results and comparisons, please see the demonstration video available at http://cv.cs.nthu.edu.tw/iresearch/CAMR-SP/index.htm.

Referring to FIG. 6, in the step 504, it performs to retain the estimated coordinate matrices X and Y as the initial solution for the next frame. Therefore, it can not be found that transient voltage of non-required pixel is incorrect because such pixel will not to be turned on in scanning process. Then, in the step 505, the process is going to the step 500 for starting the next frame retargeting.

The above description of the invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for retargeting an image, comprising:
   determining a total block structure energy of an input image content by a processing unit;
   determining a compressibility rate of said input image content based on said total block structure energy by said processing unit;
   determining an optimal scaling factor of said input image content by said processing unit; and
   warping said input image content by using a new coordinate matrices and uniformly scaling said input image content by said processing to output a target image resolution;
   wherein said compressibility rate ($r_x$ and $r_y$) of said input image content may be obtained by the following equations:

$$r_x = \frac{1}{W} \sum_x \max\left\{\left(\overline{G_{max_y\{G\}}} - \max_y\{G(x,y)\}\right), 0\right\}$$

$$r_y = \frac{1}{H} \sum_y \max\left\{\left(\overline{G_{max_x\{G\}}} - \max_x\{G(x,y)\}\right), 0\right\}$$

wherein W is a width of said input image content and H is a height of said input image content, and G(x, y) is equal to $$\sqrt{G_x(x,y)^2 + G_y(x,y)^2}$$

which denotes the intensity gradient magnitude at pixel (x, y), and $\overline{G_{max_x\{G\}}}$ and $\overline{G_{max_y\{G\}}}$ denote the averages of maximal intensity gradient values along x and y directions;

wherein said optimal scaling factor ($S_x^*$, $S_y^*$) is obtained by $$S_x^* = \beta \cdot S_y$$

$$S_y^* = \beta + 1 - \omega \cdot (r_x \cdot \beta - \beta - 1 - r_y)/(1 + \omega)(\beta^2 + 1)$$

wherein $\beta$ is equal to $W_r \cdot H_o / W_o \cdot H_r$, and ($S_x$, $S_y$) denotes a resizing factor wherein $\omega$ is a weight, wherein $W_r$ is a width of a retargeted image and $H_r$ is a height of said retargeted image, wherein $W_o$ is a width of a source image, and $H_o$ is a height of said source image.

2. The method of claim 1, further comprising a step of solving the least-squares solution of a sparse linear system by said processing unit before warping said input image content.

3. The method of claim 1, wherein said total block structure energy may be determined by an intensity gradient, block structure energy and a saliency map.

4. A method for retargeting a video, comprising:
   determining a total block structure energy and a compressibility rate of an input video content of each frame by a processing unit;
   determining an optimal scaling factor of said input video content by said processing unit; and
   warping said input video content by using a new coordinate matrices and uniformly scaling said input video content by said processing unit to output a target video resolution;
   wherein said compressibility rate ($r_x$ and $r_y$) of said input image content may be obtained by the following equations:

$$r_x = \frac{1}{W} \sum_x \max\left\{\left(\overline{G_{max_y\{G\}}} - \max_y\{G(x,y)\}\right), 0\right\}$$

$$r_y = \frac{1}{H} \sum_y \max\left\{\left(\overline{G_{max_x\{G\}}} - \max_x\{G(x,y)\}\right), 0\right\}$$

wherein W is a width of said input image content and H is a height of said input image content, and G(x, y) is equal to $$\sqrt{G_x(x,y)^2 + G_y(x,y)^2}$$

which denotes the intensity gradient magnitude at pixel (x, y), and $\overline{G_{max_x\{G\}}}$ and $\overline{G_{max_y\{G\}}}$ denote the averages of maximal intensity gradient values along x and y directions;

wherein said optimal scaling factor $(S_x^*, S_y^*)$ is obtained by $$S_x^* = \beta \cdot S_y$$
$$S_y^* = \beta + 1 - \omega \cdot (r_x \cdot \beta - \beta - 1 - r_y)/(1+\omega)(\beta^2 + 1)$$

wherein $\beta$ is equal to $W_r \cdot H_o / W_o \cdot H_r$, and $(S_x, S_y)$ denotes a resizing factor wherein $\omega$ is a weight, wherein $W_r$ is a width of a retargeted image and $H_r$ denotes a height of said retargeted image, wherein $W_o$ is a width of a source image, and $H_o$ denotes a height of said source image.

5. The method of claim 4, further comprising a step of solving the least-squares solution of a sparse linear system with constraints and smoothing said optimal scaling factors by said processing unit before warping said input video content.

6. The method of claim 5, wherein said constraints comprise, $$X_{x,y}^t - X_{x,y}^{t+1} = 0$$
$$Y_{x,y}^t - Y_{x,y}^{t+1} = 0$$

wherein X and Y denote said new coordinate matrices, and x and y denote an original coordinate matrices.

7. The method of claim 5, further comprising a step of retaining said new coordinate matrices as the initial solution for the next frame by said processing unit before warping said input video content.

8. The method of claim 4, wherein said total block structure energy may be determined by an intensity gradient, block structure energy and a saliency map.

* * * * *